United States Patent [19]

Bremond et al.

[11] Patent Number: 5,233,497
[45] Date of Patent: Aug. 3, 1993

[54] OVERVOLTAGE PROTECTION DEVICE

[75] Inventors: André Bremond, Veretz; Robert Pezzani, Vouvray; Albert Senes, Saint Cyr sur Loire, all of France

[73] Assignee: SGS-Thomson Microelectronics S.A., Gentilly, France

[21] Appl. No.: 728,227

[22] Filed: Jul. 12, 1991

[30] Foreign Application Priority Data

Jul. 13, 1990 [FR] France .................... 90 09264

[51] Int. Cl.⁵ .............................................. H02H 9/04
[52] U.S. Cl. ......................................... 361/56; 361/91
[58] Field of Search ........................... 361/56, 91, 111

[56] References Cited
U.S. PATENT DOCUMENTS 4,280,161 7/1981 Kuhn et al. ........................... 361/56
4,322,767 3/1982 El Hamamasy et al. ............. 361/56

Primary Examiner—Todd E. DeBoer
Attorney, Agent, or Firm—Lowe, Price, LeBlanc & Becker

[57] ABSTRACT

A protection device against overvoltages liable to occur between two supply terminals (A, B) comprises between the terminals, on the one hand, a thyristor (Th) and, on the other hand, first and second zener diodes in series. The anode of the first diode (D1) is connected to the cathode of the thyristor and the cathode of the second diode (D2) is connected to the anode of the thyristor, and a third zener diode (D3) is placed between the thyristor gate and the junction (10) of the first and second diodes. The third diode has an avalanche voltage higher than that of the first diode.

5 Claims, 3 Drawing Sheets

OVERVOLTAGE PROTECTION DEVICE

BACKGROUND OF THE INVENTION

The present invention relates to an overvoltage protection device.

FIG. 1 shows the conventional arrangement of a protection device 1. Given a power supply voltage available between the input terminals A and B, and an electronic circuit 2 to be protected, the protection device is positioned between the input terminals A and B.

Two main types of protection devices are commonly used.

A first type of protection device, for example a zener diode, is designed to clip the overvoltage pulses occurring between terminals A and B. The current/voltage characteristic of this component is of the type illustrated in FIG. 2A, namely, as soon as the voltage across the zener diode terminals exceeds a determined value, called breakdown voltage or avalanche voltage $V_{BR}$ of the diode, the current increases up to a substantially constant voltage. Thus, as shown in FIG. 2B, pulses P1 and P2 that are added to a supply voltage such as a full-wave rectified voltage are clipped and, upon the end of the pulse, the normal supply is again present across the terminals of the device 2 to be protected.

A second type of protection device, such as a triggering avalanche thyristor exhibits the current/voltage characteristic shown in FIG. 3A. As soon as the voltage applied to this device exceeds a value $V_{BO}$, or break over value, the device becomes conductive and the voltage across its terminals drops to a very low value. The system then remains at the conductive state as long as the supply current is not decreased to a value lower than a hold current $I_H$. By way of example, voltage $V_{BO}$ can be about a few hundreds volts and the voltage $V_H$ about ten volts. The effect of such a protection system on a full wave rectified voltage is illustrated in FIG. 3B. It can be noted that, from pulse P1, the device 2 is no longer supplied until the following half-period.

Each of the protection devices above described exhibits advantages and drawbacks.

A major drawback of zener diode systems is that, when pulses have a long duration time, a substantially high current flows during the pulse duration though the diode which has a high voltage across its terminals (about 400volts, for example, for a mains protection device) which causes an increase of the diode temperature. It is then necessary to provide large size and costly diodes.

A major drawback of devices of the avalanche thyristor type is that, after each overvoltage, supply is interrupted until resetting of the supply voltage. Thereby, malfunctions occur in the device to be protected that is no longer energized or that has to include a high input tank capacitor to palliate these voltage drops. Despite this drawback, one is induced to use protection devices of this type when overvoltages are liable to be of high energy (large amplitude or duration).

However, in practice, the problem encountered is somewhat different. Indeed, FIG. 4 shows the results of a statistic survey achieved on subscribers' lines in Europe. This survey corresponds to an observation for 112 days of a subscriber's line and shows the occurrence of 1009 overvoltages. More particularly, FIG. 4 is a table showing the probability of occurrence of overvoltages of determined amplitude and duration. The table of FIG. 4 shows that 29.44% of the observed overvoltages have a value ranging from 200 to 300 volts above the normal mains voltage and a duration ranging from 1 to 3 microseconds whereas 0.42% only of the observed overvoltages have a value ranging from 600 to 700 volts and a duration ranging from 3 to 10 microseconds.

The observed overvoltages can be classified into two groups: high energy and low energy overvoltages. High energy overvoltages are characterized either by a long time duration (for example over 10 microseconds) even if their amplitude is relatively low (for example lower than 300 volts), or by a high amplitude (for example over 600 volts) even if their duration is relatively short (for example smaller than one microsecond). Low energy overvoltages exhibit complementary characteristics. In the above example, they have an amplitude lower than 600 volts and a time duration smaller than 10 microseconds.

Referring to the table of FIG. 4, it can be noted that low energy pulses occur in 96.38% of the observed cases, whereas high current overvoltages represent only 3.62% of the cases. However, conventionally, and to take into account high energy overvoltages, a clipping-type protection device such as a zener diode is not sufficient and it is necessary to resort to a shorting-type device such as avalanche thyristor.

SUMMARY OF THE INVENTION

An object of the invention is to provide a protection device operating in a clipping mode for low energy overvoltage pulses and in a shorting mode only for high energy pulses.

To attain these objects and others, the invention provides a protection device against overvoltages liable to occur between two supply terminals, comprising, between these terminals, on the one hand, a thyristor and, on the other hand, first and second zener diodes in series, the anode of the first diode being connected to the cathode of the thyristor and the cathode of the second diode being connected to the anode of the thyristor, and a third zener diode positioned between the thyristor gate and the junction of the first and second diodes, the third diode having an avalanche voltage higher than that of the first diode.

BRIEF DESCRIPTION OF THE DRAWINGS

The foregoing and other objects, features and advantages of the invention will be apparent from the following detailed description of preferred embodiments as illustrated in the accompanying FIGS. wherein.

DETAILED DESCRIPTION OF THE INVENTION

Figure 1:
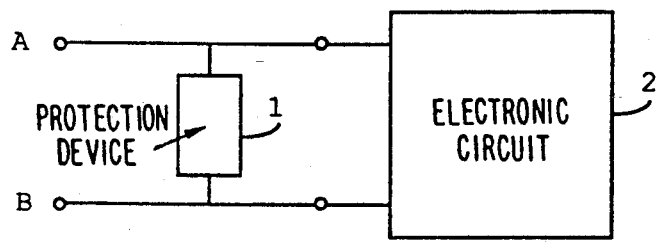
FIGS. 1-4, designed to illustrate the prior art and the problem that the invention aims at solving, are above described.
Figure 2A:
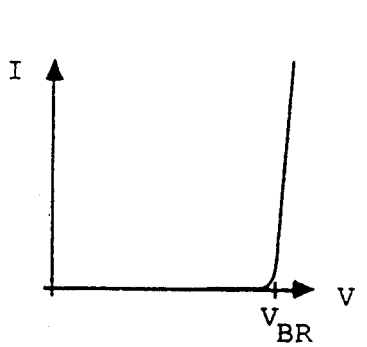
Figure 2B:
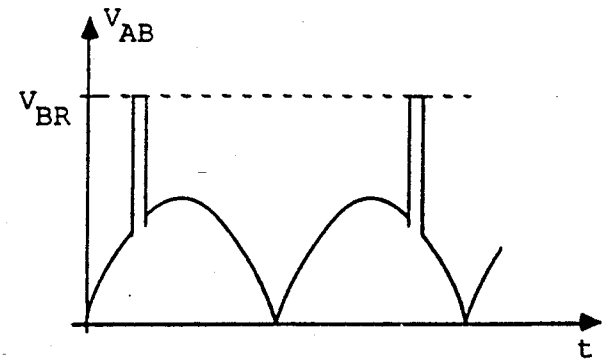
Figure 3A:
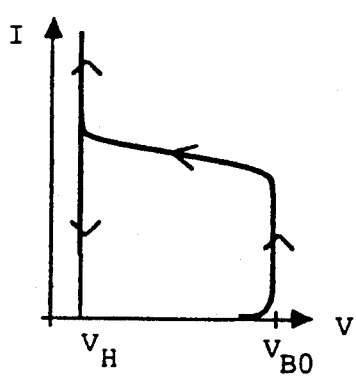
Figure 3B:
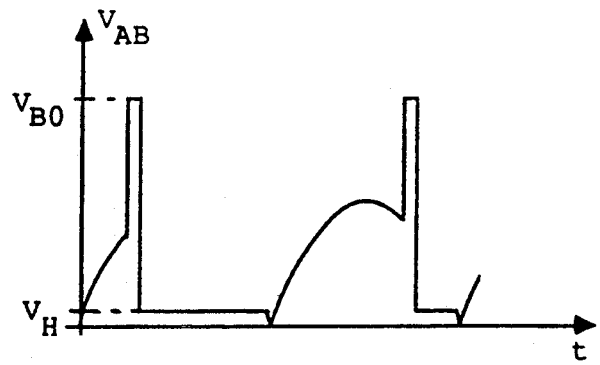
Figure 4:
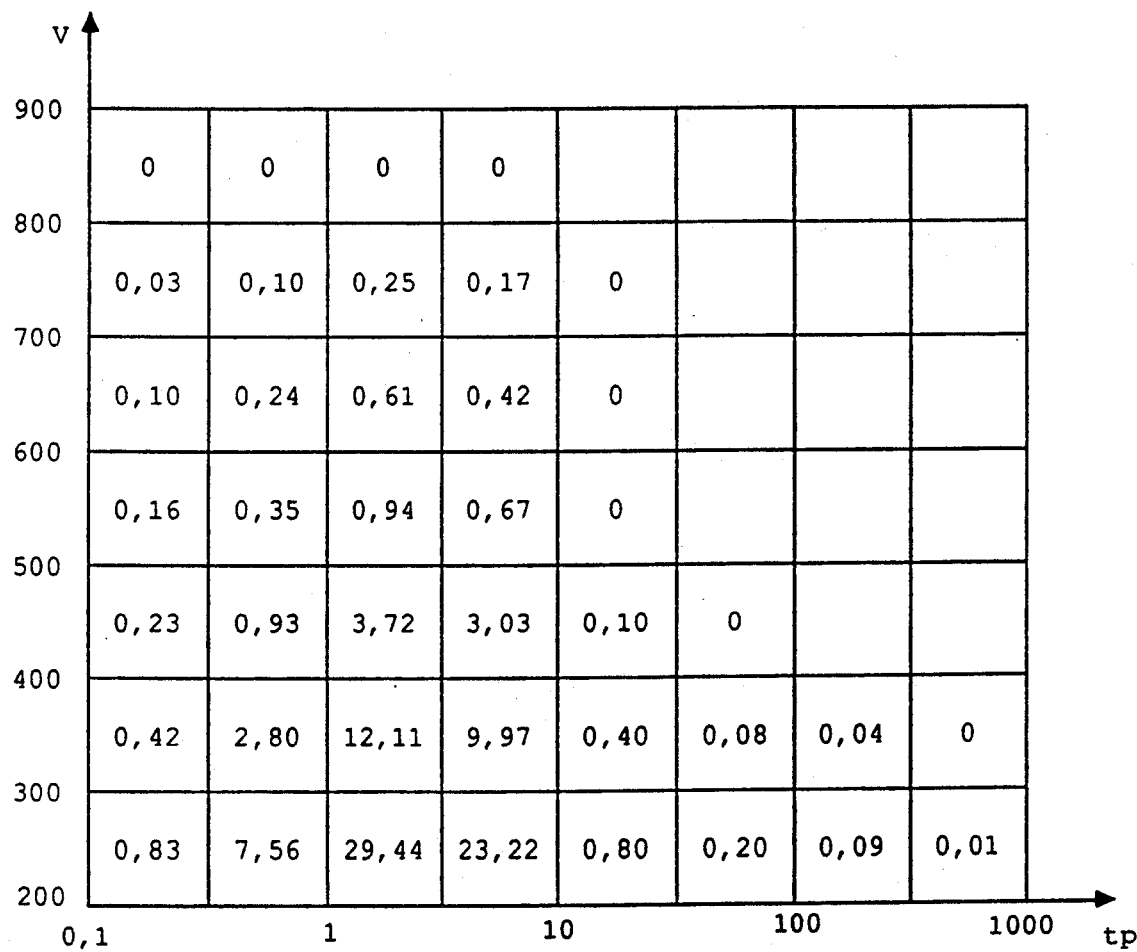
Figure 5:
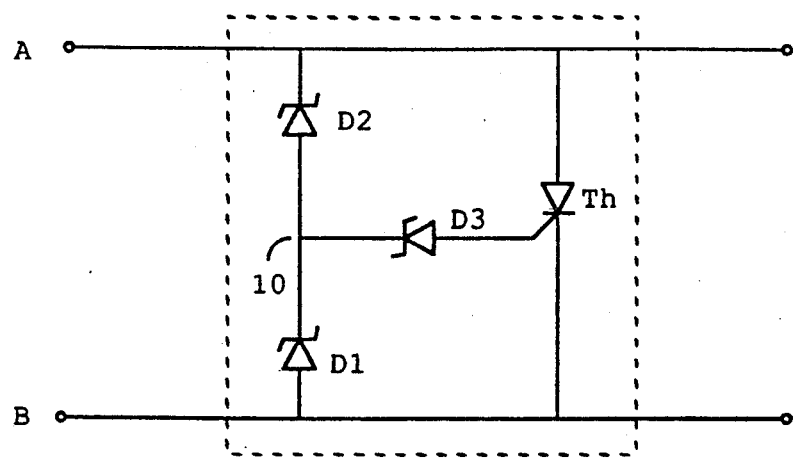
FIG. 5 is a circuit diagram of a protection device according to the invention.

As shown in FIG. 5, the device according to the invention comprises, between terminals A and B wherein is liable to occur an overvoltage pulse, the series connection of two diodes D2 and D1, the cathode of diode D2 being connected to the terminal A and the anode of diode D1 to terminal B. Between terminals A and B, is also positioned a thyristor Th, the anode of which is connected to terminal A and the cathode of which is connected to terminal B. The thyristor comprises a cathode gate connected through a third zener diode D3 to the junction 10 of diodes D1 and D2. Thyristor Th is selected so that its break over voltage $V_{BO}$ is substantially higher than the sum of the avalanche voltages of diodes D1 and D2. Thus, in the invention, thyristor Th can be rendered conductive only by gate control.

Diodes D1, D2 and D3 have avalanche voltages equal to $V_{BR1}$, $V_{BR2}$ and $V_{BR3}$, respectively. According to the invention, $V_{BR3}$ is selected higher than $V_{BR1}$. Given the voltage values liable to be applied to the protection devices (about a few hundreds volts), the gate-cathode voltage drop of the thyristor (about 1 volt) is negligible and will not be considered in the subsequent explanations.

Figure 6A:
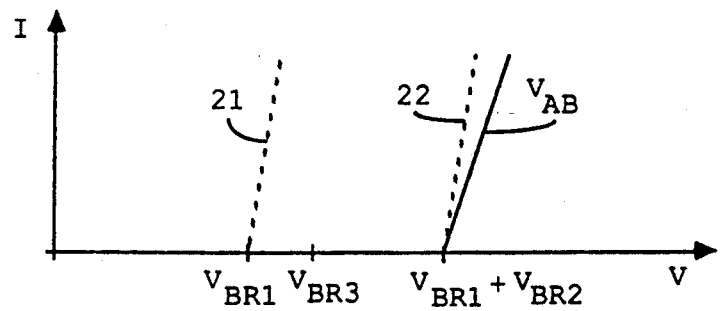
FIGS. 6A and 6B show two specific types of operation of the protection device according to the invention.

FIG. 6A is a current/voltage (I/V) diagram of the operation of the protection device according to the invention for low energy overvoltages. When the overvoltage value becomes higher than $V_{BR1}+V_{BR2}$, both diodes D2 and D1 are set to the avalanche mode and maintain the voltage across their terminals substantially to respective values $V_{BR1}$ and VBR2. However, as shown by curves 21 and 22 drawn in dot-and-dash line, the voltage across their terminals slightly increases while a current circulates therethrough. The resulting $V_{AB}$ voltage is represented by a curve drawn in solid line.

Figure 6B:
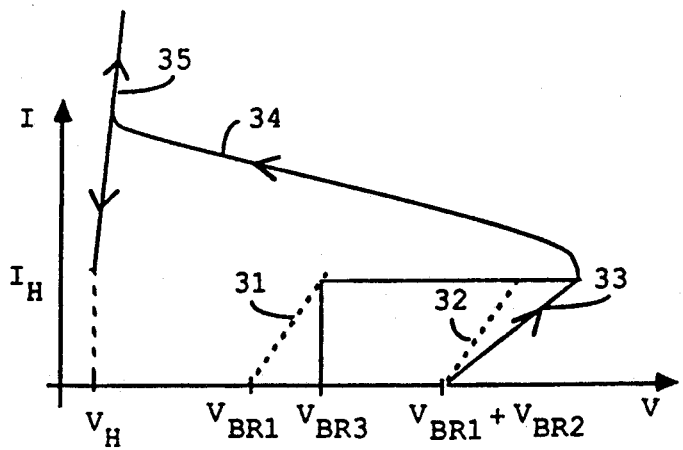

FIG. 6B shows the same current/voltage diagram in case of a high current or long overvoltage. Once the diodes are set to the avalanche mode, a relatively high current circulates and, if the overvoltage has a high amplitude or a long time duration, the voltage across the terminals of each diode is increased especially because of temperature rise, as shown by the curves 31 and 32 drawn in dotted line, the resulting voltage $V_{AB}$ being illustrated by the curve 33. As soon as the voltage across diode D1 reaches the avalanche voltage $V_{BR3}$ of diode D3, thyristor Th is set conductive and the resulting voltage $V_{AB}$ follows the path 34–35. Then, the thyristor remains conductive until the current becomes lower than the hold current $I_H$ of the thyristor.

Then, a device operating as a clipping circuit for low current pulses and as a shorting circuit for high current pulses is obtained.

Those skilled in the art will be able, as a function of the characteristics they desire to obtain for the protection device in view of a specific application, to select the difference between the avalanche voltages of diodes D1 and D3 which determines the transition from a clipping device to a shorting device operation.

On the other hand, it will be noted that the slopes and shapes of the current/voltage diagrams are arbitrarily drawn in order to simplify the illustration and the disclosure of the invention. Those skilled in the art will be able to refer to the usual characteristics of zener diodes and thyristors to draw accurate diagrams.

In practice, the sum of the avalanche voltages of diodes D1 and D2 can be chosen close to 400 volts, both diodes being identical, and diode D3 can be chosen with an avalanche voltage of about 250 volts. In such a way, the system acts as a clipping circuit substantially from 400 to 450 volts, then as a shorting circuit over 450 volts.

The invention has been disclosed in a general way and in connection with preferred embodiments. Those skilled in the art will be able to bring various variants and modifications. Especially, they will be able to use components other than zener diode and thyristors but having similar functions. On the other hand, an unidirectional protection device is described above. The invention similarly applies to bidirectional protection components; the changes and connections designed to form bidirectional protection devices from unidirectional protection devices being well known by those skilled in the art.

We claim:

1. A protection device against overvoltages liable to occur between two supply terminals comprising, a thyristor connected between said terminals, first and second zener diodes connected in series between said terminals, the anode of said first diode being connected to the cathode of said thyristor and the cathode of said second diode being connected to the anode of said thyristor, and a third zener diode connected between the thyristor gate and the junction of said first and second diodes, said third diode having an avalanche voltage higher than that of said first diode.

2. A protection circuit for protection against overvoltage surges occurring at a pair of terminals connected to a power supply, comprising:
   clipping means for limiting the voltage at said pair of terminals to a first nominal voltage level in response to surge energy at said pair of terminals exceeding a first predetermined threshold;
   shorting means for limiting the voltage at said pair of terminals to a second nominal voltage level, said second nominal voltage level being substantially less than said first nominal voltage level, in response to surge energy exceeding a second predetermined threshold higher than said first predetermined threshold,
   whereby the protection circuit automatically switches from a clipping mode of operation to a shorting mode of operation when the surge energy reaches said second predetermined threshold.

3. A protection circuit as recited in claim 2, wherein said clipping means comprises first and second zener diodes connected in series across said pair of terminals, the anode of said first zener diode being directly connected to the cathode of said second zener diode.

4. A protection circuit as recited in claim 3, wherein said shorting means comprises a thyristor connected in parallel across said pair of terminals, said thyristor having a gate responsive to the voltage at the junction of said first and second zener diodes, said clipping means thereby forming a voltage divided input to said shorting means.

5. A protection circuit as recited in claim 4, wherein said shorting means further comprises a third zener diode connected between the thyristor gate and said junction, the third zener diode having an avalanche voltage higher than the avalanche voltage of said first zener diode.

* * * * *